United States Patent
Kim et al.

(10) Patent No.: US 12,535,793 B2
(45) Date of Patent: Jan. 27, 2026

(54) INTELLIGENT EDGE INTERROGATOR, SERVER, AND CONTROL METHOD OF INTEGRATED FACILITY SAFETY CONTROL SYSTEM INCLUDING THE INTELLIGENT EDGE INTERROGATOR AND THE SERVER

(71) Applicant: ELECTRONICS AND TELECOMMUNICATIONS RESEARCH INSTITUTE, Daejeon (KR)

(72) Inventors: Jeong Eun Kim, Daejeon (KR); Hyun Seo Kang, Daejeon (KR); Keo Sik Kim, Daejeon (KR); Kyeeun Kim, Daejeon (KR); Daegil Kim, Daejeon (KR); Gi Hyeon Min, Daejeon (KR); Si Woong Park, Daejeon (KR); Hyoungjun Park, Daejeon (KR); Chan Il Yeo, Daejeon (KR); Aram Lee, Daejeon (KR); Young Soon Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 473 days.

(21) Appl. No.: 18/075,511

(22) Filed: Dec. 6, 2022

(65) Prior Publication Data
US 2023/0409003 A1 Dec. 21, 2023

(30) Foreign Application Priority Data
Jun. 20, 2022 (KR) .................. 10-2022-0074700

(51) Int. Cl.
*G05B 19/406* (2006.01)
*G05B 13/02* (2006.01)

(52) U.S. Cl.
CPC ....... *G05B 19/406* (2013.01); *G05B 13/0265* (2013.01); *G05B 2219/50193* (2013.01)

(58) Field of Classification Search
CPC .............. G05B 19/406; G05B 13/0265; G05B 2219/50193; G05B 15/02; G06Q 50/10;
(Continued)

(56) References Cited

U.S. PATENT DOCUMENTS 9,459,513 B2  10/2016 Carralero et al.
2015/0025700 A1  1/2015 Choi et al.
(Continued)

FOREIGN PATENT DOCUMENTS

CN  103700221 A  * 4/2014
CN  210953847 U  * 7/2020
(Continued)

*Primary Examiner* — Chad G Erdman
(74) *Attorney, Agent, or Firm* — LRK PATENT LAW FIRM (57) ABSTRACT

A control method of an integrated facility safety control system predicts short-term safety of a facility by using an artificial intelligence (AI) model embedded in an intelligent edge interrogator and predicts long-term safety of the facility on the basis of long-term sensing data received from the intelligent edge interrogator by using an AI model embedded in a server. Accordingly, a server and an intelligent edge interrogator may divisionally perform an analysis operation on the short-term safety and long-term safety of facility on the basis of data collected from an optical fiber sensor, and thus, may solve a load of data concentrating on a server, a problem of computing power, and a network problem caused by massive data transmission.

13 Claims, 5 Drawing Sheets

(58) Field of Classification Search
CPC ...... G06Q 10/0635; G01D 5/353; G06N 3/08;
G06N 20/00; G08B 21/18; H04L 67/12
See application file for complete search history.

(56) References Cited

U.S. PATENT DOCUMENTS

| | | |
|---|---|---|
| 2021/0240167 A1 | 8/2021 | Kang et al. |
| 2021/0294172 A1* | 9/2021 | Rasmus-Vorrath ...... G02F 1/163 |
| 2021/0302621 A1* | 9/2021 | Brown ..................... H04Q 9/00 |
| 2025/0102284 A1* | 3/2025 | Cavanaugh .............. G01B 5/30 |

FOREIGN PATENT DOCUMENTS

| | | | | |
|---|---|---|---|---|
| CN | 113315124 A | * | 8/2021 | ............ H02J 3/0012 |
| CN | 113779888 A | * | 12/2021 | ........... G06F 18/214 |
| CN | 114444683 A | * | 5/2022 | |
| JP | 2019-210764 A | | 12/2019 | |
| KR | 10-2197696 B1 | | 1/2021 | |
| KR | 10-2021-0024762 A | | 3/2021 | |
| KR | 10-2246456 B1 | | 4/2021 | |
| KR | 10-2291259 B1 | | 8/2021 | |

\* cited by examiner

INTELLIGENT EDGE INTERROGATOR, SERVER, AND CONTROL METHOD OF INTEGRATED FACILITY SAFETY CONTROL SYSTEM INCLUDING THE INTELLIGENT EDGE INTERROGATOR AND THE SERVER

CROSS-REFERENCE TO RELATED APPLICATION

This application claims the benefit of the Korean Patent Application No. 10-2022-0074700 filed on Jun. 20, 2022, which is hereby incorporated by reference as if fully set forth herein.

BACKGROUND

1. Field of the Invention

The present invention relates to an integrated facility safety control system, and more particularly, to a control method of an integrated facility safety control system which diagnoses the safety of distributed facilities by using an interrogator of an optical fiber sensor.

2. Description of Related Art

Recently, in order to prevent safety accidents of facilities such as buildings, tunnels, bridges, and dams, interest in optical fiber sensors for monitoring states of the facilities is increasing.

Optical fiber sensors may measure an optical wavelength variation corresponding to a physical change around a corresponding sensor to sense physical quantity, representing states of facility such as a strain, a displacement, and a vibration of the facility, in a semi-distributed form, and thus, are being widely used because of an advantage where there is no interference by an electromagnetic wave.

To monitor facility on the basis of an optical fiber sensor, light of a broad wavelength band should be transmitted to the optical fiber sensor, and an optical signal reflected from the optical fiber sensor should be collected and analyzed. Equipment having such a function is an interrogator.

One facility needs one interrogator. As the kinds and number of facilities increase, the number of interrogators increases also. In this case, an analysis operation on an optical signal is performed for each interrogator, and such an analysis method is inefficient.

To solve such problems, there may be a method where a plurality of interrogators transmit data, collected from a corresponding optical fiber sensor, to a center server and the center server comprehensively analyzes the data collected from the plurality of interrogators. However, a centralized analysis method causes a load of data concentrating on a center server, a problem of computing power, and a network problem caused by massive data transmission.

SUMMARY

An aspect of the present invention is directed to providing a control method of an integrated facility safety control system, an intelligent edge interrogator, and a server, which may distribute an analysis operation performed on sensing data, provided from an optical fiber sensor, by a center server by using the intelligent edge interrogator so as to solve a load of data concentrating on a center server, a problem of computing power, and a network problem caused by massive data transmission.

To achieve these and other advantages and in accordance with the purpose of the invention, as embodied and broadly described herein, there is provided a control method of an integrated facility safety control system, the control method including: collecting short-term sensing data and long-term sensing data based on a physical change in a facility by using an intelligent edge interrogator; analyzing the short-term sensing data to obtain short-term diagnosis data representing short-term safety of the facility by using a short-term safety analysis artificial intelligence (AI) model embedded in the intelligent edge interrogator; transmitting at least one of the short-term diagnosis data and the long-term sensing data to a server by using the intelligent edge interrogator; and analyzing the long-term sensing data to obtain long-term diagnosis data representing long-term safety of the facility and transmitting a notification message, indicating a risk situation of the facility, to a facility management organization on a basis of the short-term diagnosis data or the long-term sensing data by using a long-term safety analysis AI model embedded in the server.

In an embodiment, the collecting may include: receiving an optical signal, which is based on the physical change in the facility, from an optical fiber sensor attached on the facility; measuring an optical wavelength of the optical signal to obtain sensing data; and preprocessing the sensing data to obtain the short-term sensing data and the long-term sensing data.

In an embodiment, the obtaining of the short-term sensing data and the long-term sensing data may include: sampling the sensing data by predetermined time units to obtain the short-term sensing data; and calculating an average value or a feature value of the short-term sensing data to obtain the long-term sensing data.

In an embodiment, the collecting may include: receiving an optical signal, which is based on the physical change in the facility, from an optical fiber sensor attached on the facility; measuring an optical wavelength of the optical signal to obtain sensing data; performing a first data preprocessing process to extract the short-term sensing data from the sensing data; and performing a second data preprocessing process to extract the long-term sensing data from the short-term sensing data.

In an embodiment, the extracting of the long-term sensing data may include selectively performing the second data preprocessing process on a basis of the risk situation of the facility based on the short-term diagnosis data.

In an embodiment, when the short-term diagnosis data may represent the risk situation of the facility, the second data preprocessing process is not performed.

In an embodiment, the transmitting of the at least one of the short-term diagnosis data and the long-term sensing data to the server may include, when the short-term diagnosis data represents the risk situation of the facility, transmitting only the short-term diagnosis data to the server.

In another aspect of the present invention, there is provided a learning method of an artificial intelligence (AI) model for predicting safety of a facility, the learning method including: collecting learning sensing data corresponding to an optical signal based on a physical change in a facility by using an intelligent edge interrogator; preprocessing the learning sensing data to extract learning short-term sensing data and learning short-term sensing data by using the intelligent edge interrogator; learning the learning short-term sensing data to predict short-term safety of the facility by using a short-term safety analysis AI model embedded in the intelligent edge interrogator; transmitting, to a server, the learning long-term sensing data and learning short-term diagnosis data obtained by the short-term safety analysis AI model through prediction performed based on the learning short-term sensing data by using the intelligent edge interrogator; and learning the learning short-term sensing data and learning short-term sensing data to predict long-term safety of the facility by using a long-term safety analysis AI model embedded in the server.

In an embodiment, the collecting may include: receiving the optical signal, which is based on the physical change in the facility, from an optical fiber sensor attached on the facility; and measuring an optical wavelength of the optical signal to obtain the learning sensing data.

In an embodiment, the extracting may include: sampling the learning sensing data by predetermined time units to extract the learning short-term sensing data from the learning sensing data; and calculating an average value or a feature value of the learning short-term sensing data to extract the learning long-term sensing data from the learning short-term sensing data.

In an embodiment, the learning of the learning short-term sensing data may include learning the learning short-term sensing data, based on machine learning or deep learning.

In an embodiment, the learning of the learning long-term sensing data may include learning the learning long-term sensing data, based on machine learning or deep learning.

In another aspect of the present invention, there is provided an intelligent edge interrogator including: a processor and a memory; a light receiver configured to receive an optical signal from an optical fiber sensor attached on a facility, based on control by the processor; an optical signal measurer configured to measure an optical wavelength of the optical signal to output sensing data representing a physical change in the facility, based on control by the processor; a preprocessor loaded into the memory and configured to extract at least one of short-term sensing data and long-term sensing data from the sensing data, based on control by the processor; a short-term safety analysis artificial intelligence (AI) model loaded into the memory and configured to analyze the short-term sensing data to output short-term diagnosis data representing short-term safety of the facility, based on control by the processor; and a communication interface configured to transmit the short-term diagnosis data and the long-term sensing data to a server, based on control by the processor.

In an embodiment, the long-term sensing data may be used to predict and diagnose long-term safety of the facility in a long-term safety analysis AI model embedded in the server.

In an embodiment, when the short-term diagnosis data represents a risk situation of the facility, the preprocessor may stop a preprocessing process of extracting the long-term sensing data from the sensing data.

In an embodiment, when the short-term diagnosis data represents a risk situation of the facility, the communication interface may transmit only the short-term diagnosis data to the server.

In an embodiment, when the short-term diagnosis data does not represent a risk situation of the facility, the communication interface may transmit only the long-term sensing data to the server.

In another aspect of the present invention, there is provided a server including: a processor; a communication interface configured to receive, from an intelligent edge interrogator, short-term diagnosis data obtained by predicting short-term safety of a facility and long-term sensing data based on a physical change in the facility, based on control by the processor; and a memory into which a long-term safety analysis artificial intelligence (AI) model analyzing the long-term sensing data to predict long-term safety of the facility is loaded, based on control by the processor.

In an embodiment, the short-term diagnosis data may be data obtained by analyzing short-term sensing data by using a short-term safety analysis AI model embedded in the intelligent edge interrogator.

It is to be understood that both the foregoing general description and the following detailed description of the present invention are exemplary and explanatory and are intended to provide further explanation of the invention as claimed.

DETAILED DESCRIPTION OF THE INVENTION

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

In the following description, the technical terms are used only for explain a specific exemplary embodiment while not limiting the present invention. The terms of a singular form may include plural forms unless referred to the contrary. Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
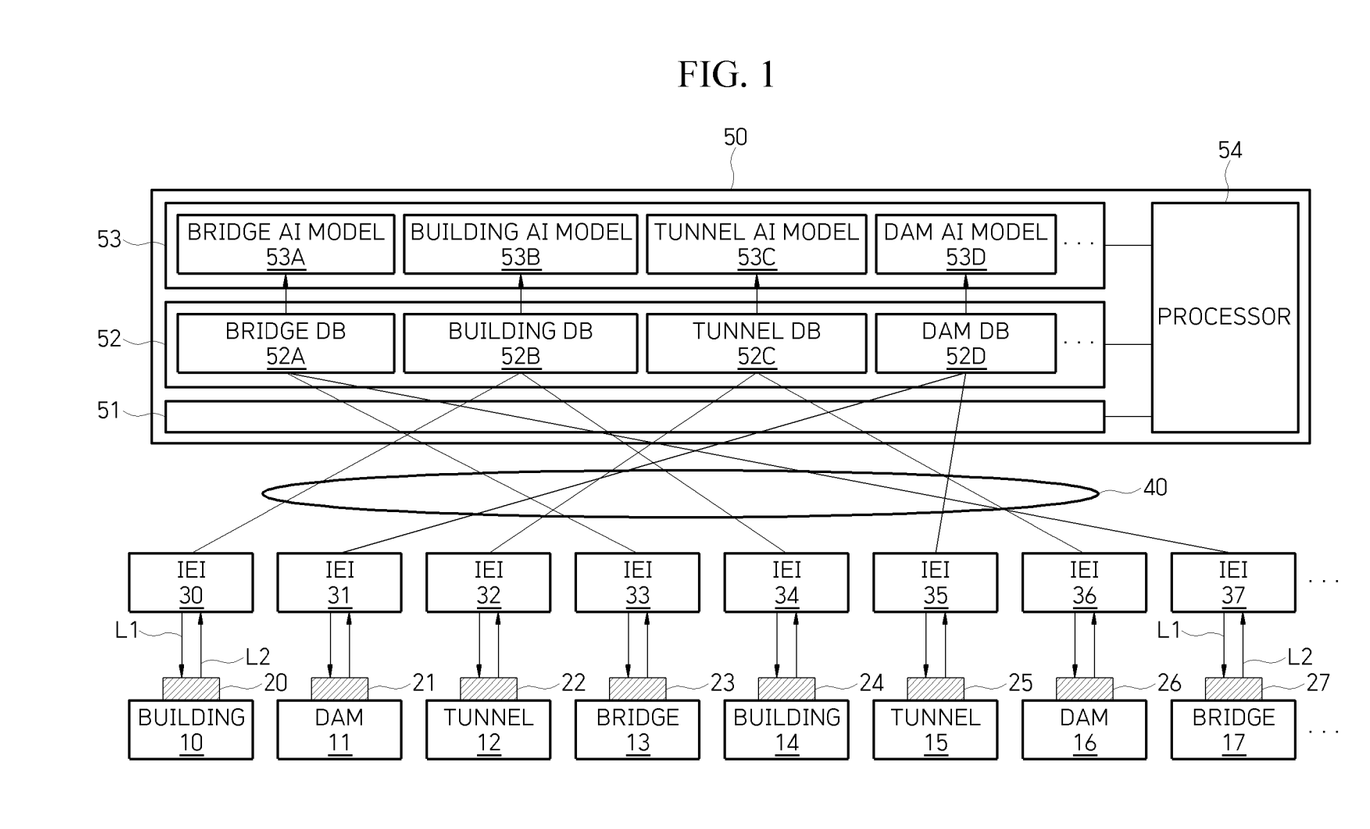
FIG. 1 is a block diagram of an integrated facility safety control system according to an embodiment of the present invention.

FIG. 1 is a block diagram of an integrated facility safety control system according to an embodiment of the present invention.

Referring to FIG. 1, the integrated facility safety control system according to an embodiment of the present invention may include a plurality of optical fiber sensors 20 to 27, a plurality of intelligent edge interrogators (IEIs) 30 to 37, and a server 50.

The plurality of optical fiber sensors 20 to 27 may be attached on a plurality of facilities 10 to 17. Each of the plurality of optical fiber sensors 20 to 27 may sense an optical wavelength corresponding to a physical change in a corresponding facility and may transmit an optical signal having the sensing optical wavelength to the plurality of intelligent edge interrogators 30 to 37.

The plurality of facilities 10 to 17 may be the same type or different types. For example, the plurality of facilities 10 to 17 may include a plurality of buildings located at different places, a plurality of dams located at different places, a plurality of tunnels located at different places, and a plurality of bridges located at different places.

Each optical fiber sensor may be connected to a corresponding intelligent edge interrogator by an optical fiber line. The optical fiber line may include a first optical fiber line L1 which transfers light of a broad wavelength band, generated by an intelligent edge interrogator, to an optical fiber sensor and a second optical fiber line L2 which transfers an optical signal (an optical signal having an optical wavelength corresponding to a physical change in a facility), reflected by the optical fiber sensor, to the intelligent edge interrogator.

Each intelligent edge interrogator may measure an optical signal (an optical wavelength), which corresponds to a physical change in a corresponding facility and is received from a corresponding optical fiber sensor through the second optical fiber line L2, to sensing data and may analyze the obtained sensing data to diagnose and predict short-term safety of the corresponding facility.

An artificial intelligence (AI) model, pre-learned (trained) based on learning (training) sensing data corresponding a short-term physical change in the corresponding facility and/or learning scale data representing, by classes, safety of facilities on the basis of the learning sensing data, may be used for diagnosing and predicting short-term safety of a corresponding facility. Also, the AI model may be a deep learning model or a machine learning model which performs self-learning on the basis of below-described short-term sensing data collected in real time.

Each intelligent edge interrogator may diagnose and predict short-term safety of a corresponding facility by using the AI model to generate short-term diagnosis data. Here, the short-term diagnosis data may be scale data where risk situations of corresponding facilities are classified by classes.

The AI model (hereinafter referred to as a short-term safety analysis AI model) which analyzes short-term safety of a corresponding facility to diagnose and predict safety may use short-term sensing data, extracted from sensing data, as input data. Here, the short-term data may denote a set of data obtained by sampling the sensing data by short time units such as a minute unit, an hour unit, a day unit, or a week unit. To extract short-term sensing data from the sensing data, each intelligent edge interrogator may perform a data preprocessing process on the sensing data.

Moreover, each intelligent edge interrogator may extract long-term sensing data from the sensing data through the data preprocessing process. Here, the long-term sensing data may be a set of data representing an average or feature points (feature patterns) of pieces of short-term data. To extract an average or a feature point (a feature pattern), for example, a missing value processing process of the data preprocessing process may be used.

The long-term sensing data may be transmitted to the server 50, and the server 50 may analyze the long-term sensing data to diagnose and predict long-term safety of a corresponding facility.

Furthermore, each intelligent edge interrogator may transmit the long-term sensing data to the server 50, and then, may delete the long-term sensing data to reduce a data load based on storing of the long-term sensing data. An internal configuration of the intelligent edge interrogator will be described in detail with reference to FIG. 2.

The server 50 may receive short-term diagnosis data from each of the plurality of intelligent edge interrogators 30 to 37, and when a risk situation (collapse risk) of a corresponding facility is detected based on the short-term diagnosis data, the server 50 may transmit a notification message, indicating a risk situation, to a facility management server (not shown) which manages the corresponding facility.

Moreover, the server 50 may analyze long-term sensing data received (collected) from each of the plurality of intelligent edge interrogators 30 to 37 over a communication network 40 to diagnose and predict long-term safety of the plurality of intelligent edge interrogators 30 to 37.

The facility management server (not shown) may provide announcement for evacuating inhabitants near the corresponding facility on the basis of the notification message from the server 50, or may transmit a notification message indicating the maintenance and repair of a corresponding facility installed in a specialized organization which performs the maintenance and repair of the corresponding facility.

The server 50 may include the communication interface 51, a storage medium 52, a memory 53, and a processor 54.

The communication interface 51 may receive short-term diagnosis data and long-term sensing data from each of the plurality of intelligent edge interrogators 30 to 37 over the communication network 40, based on control by the processor 54, and may store the received short-term diagnosis data and long-term sensing data in the storage medium 52.

The communication network 40 may include a wired Internet service, local area network (LAN), wideband area network (WAN), Intranet, a wireless Internet service, a mobile computing service, a wireless data communication service, a wireless Internet access service, a satellite communication service, a wireless data communication service such as 3G, 4G, or 5G, and a close-distance wireless communication service such as Wi-Fi or Bluetooth.

The communication interface 51 may include hardware elements for supporting the communication service. The present invention may not be characterized in a hardware configuration of the communication interface 51, and thus, a description thereof may be replaced with known technology.

The storage medium 52 may store a plurality of databases which are classified based on types of the facilities 10 to 17, on the basis of control by the processor 54. The plurality of databases may include, for example, a bridge database (DB) 52A, building databases 52B, tunnel databases 52C, and a dam database 52D.

The bridge database 52A may store short-term diagnosis data and long-term sensing data of bridges 13, 17, . . . collected (received) from intelligent edge interrogators 33, 37, . . . . The building databases 52B may store short-term diagnosis data and long-term sensing data of buildings 10, 14, . . . collected (received) from intelligent edge interrogators 30, 33, . . . . The tunnel databases 52C may store short-term diagnosis data and long-term sensing data of tunnels 12, 16, . . . collected (received) from intelligent edge interrogators 32, 36, . . . . The dam databases 52D may store short-term diagnosis data and long-term sensing data of dams 11, 15, . . . collected (received) from intelligent edge interrogators 31, 35, . . . .

Moreover, the storage medium 52 may further store an AI model (hereinafter referred to as a long-term safety analysis AI model) for analyzing long-term safety of corresponding facilities by using, as input data, long-term sensing data stored in each of the databases 52A, 52B, 52C, 52D, . . . .

The long-term safety analysis AI model may be a machine learning model or/and deep learning model pre-learned based on learning (training) long-term sensing data. Although described below, a pre-learned long-term safety analysis AI model may learn a learning variable of a short-term safety analysis AI model embedded in an intelligent edge interrogator.

The learning variable may be, for example, a weight value representing connection strength between layers or nodes configuring an artificial neural network. Each of the layers may be a set of nodes. Here, a node may be an element which imitates a biological neural of brains of a person. Each database of the storage medium 52 may further store the learning variable received from a corresponding intelligent edge interrogator.

The long-term safety analysis AI model may include a plurality of AI models which are classified based on types of facilities, and for example, may include a bridge AI model 53A, a building AI model 53B, a tunnel AI model 53C, and a dam AI model 53D.

The bridge AI model 53A may analyze long-term sensing data of the bridges 13, 17, . . . stored in the bridge database 52A to predict and diagnose long-term safety of the bridges 13, 17, . . . on the basis of an analysis result. The building AI model 53B may analyze long-term sensing data of the buildings 10, 14, . . . stored in the building database 52B to predict and diagnose long-term safety of the buildings 10, 14, . . . on the basis of an analysis result. The tunnel AI model 53C may analyze long-term sensing data of the tunnels 12, 16, . . . stored in the tunnel database 52C to predict and diagnose long-term safety of the tunnels 12, 16, . . . on the basis of an analysis result. The dam AI model 53D may analyze long-term sensing data of the dams 11, 15, . . . stored in the dam database 52D to predict and diagnose long-term safety of the dams 11, 15, . . . on the basis of an analysis result.

The memory 53 may provide an execution space for executing long-term safety analysis AI models 53A, 53B, 53C, 53D, . . . stored in the storage medium 52, based on control by the processor 54. In this case, the memory 53 may be a volatile memory and may further include a non-volatile memory.

Long-term safety analysis AI models 55A, 55B, 55C, 55D, . . . executed by the processor 54 may analyze long-term sensing data of a corresponding facility received through a corresponding intelligent edge interrogator to predict and diagnose long-term safety of the corresponding facility.

Long-term diagnosis data obtained by predicting and diagnosing long-term safety may be expressed as scale data where risk situations of corresponding facilities are classified by classes, identically or similarly to the above-described short-term diagnosis data.

The processor 54 may continuously monitor risk situations of facilities distributed based on long-term diagnosis data, and when a risk situation (collapse risk) of a corresponding facility is recognized, the processor 54 may transmit a notification message to a facility management server (not shown). The facility management organization may provide announcement for evacuating inhabitants near the corresponding facility on the basis of the notification message from the server 50, or may transmit a notification message indicating the maintenance and repair of a corresponding facility installed in a specialized organization which performs the maintenance and repair of the corresponding facility.

The processor 54 may be a hardware element which controls and manages overall operations of the communication interface 51, the storage medium 52, and the memory 53 and may be implemented with at least one central processing unit (CPU), at least one graphics processing unit (GPU), or a combination thereof.

The processor 54 may load the long-term safety analysis AI models 53A 53B, 53C, 53D, . . . , stored in the storage medium 52, into the memory 53 to execute the AI models. The processor 54 may generate a notification message which evacuates inhabitants near the corresponding facility or indicates the maintenance and repair of the corresponding facility, based on long-term data generated from the executed long-term safety analysis AI models 53A 53B, 53C, 53D, . . . and may transmit the generated notification message to a relevant organization through the communication interface 51.

Figure 2:
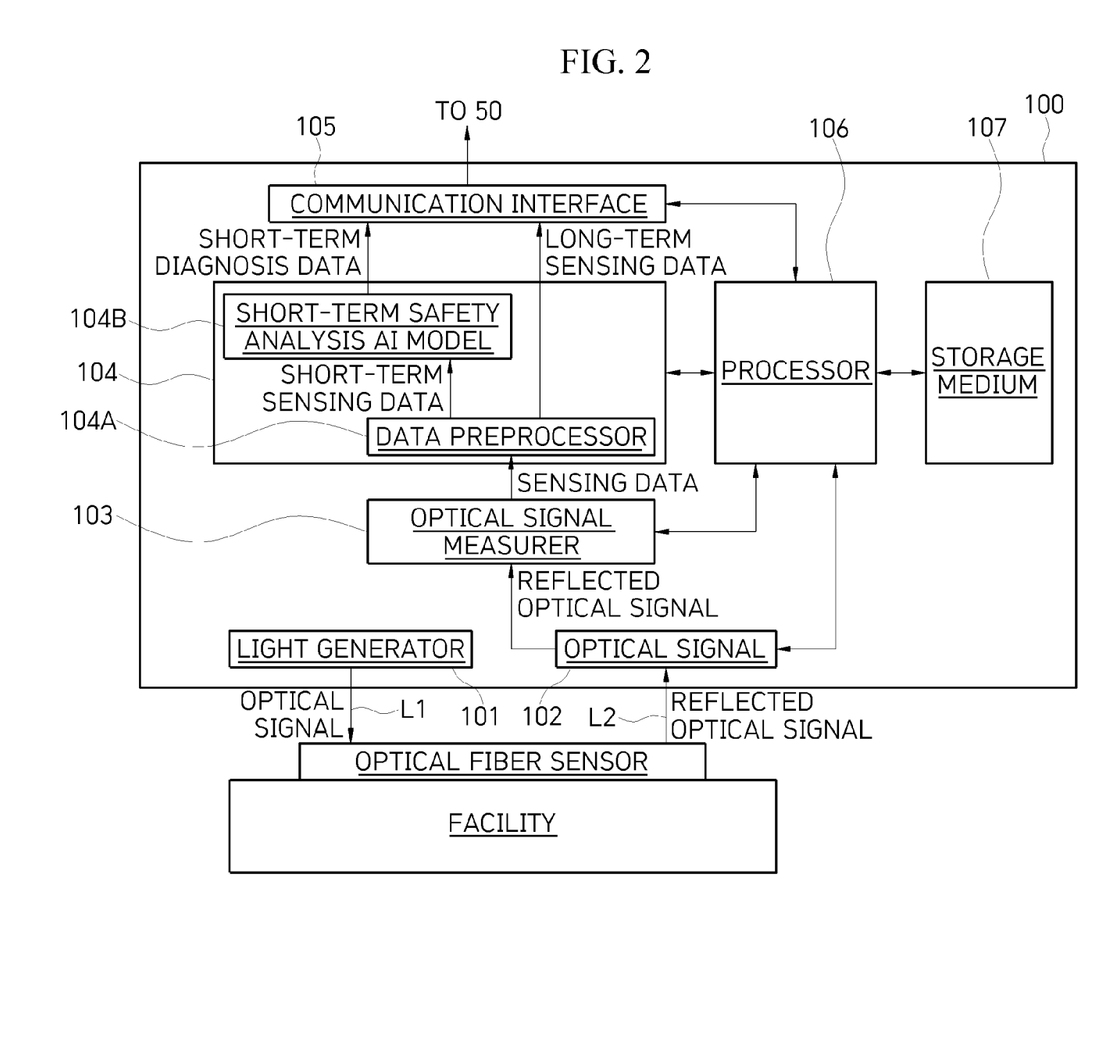
FIG. 2 is a block diagram schematically illustrating an internal configuration of an intelligent edge interrogator according to an embodiment of the present invention.
Figure 3:
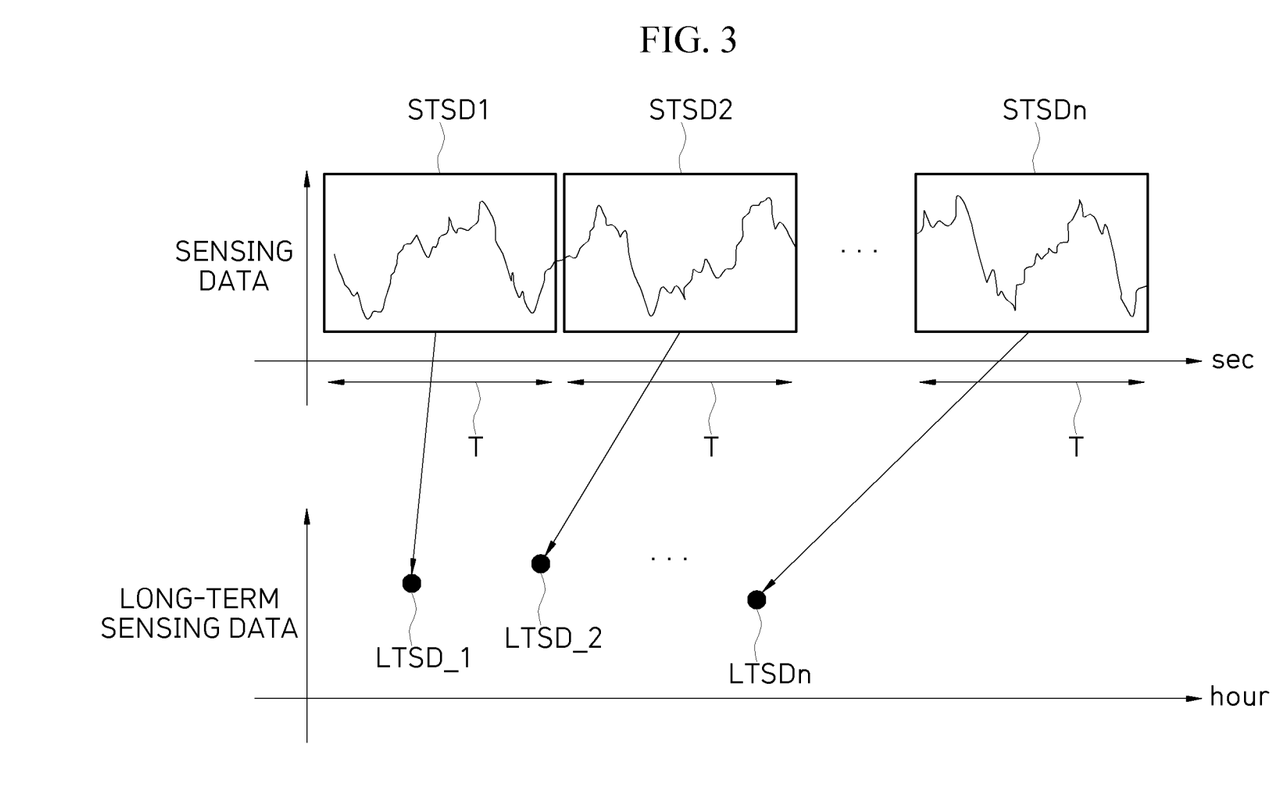
FIG. 3 is a diagram for describing short-term sensing data and long-term sensing data according to an embodiment of the present invention.

FIG. 2 is a block diagram schematically illustrating an internal configuration of an intelligent edge interrogator according to an embodiment of the present invention, and FIG. 3 is a diagram for describing short-term sensing data and long-term sensing data according to an embodiment of the present invention.

For conciseness of the drawings, FIG. 2 illustrates one facility of the facilities illustrated in FIG. 1 and one optical fiber sensor attached on the one facility. The optical fiber sensor illustrated in FIG. 2 is one of the optical fiber sensors 20 to 27 illustrated in FIG. 1. Reference numerals of the facility and the optical fiber sensor illustrated in FIG. 2 are omitted. Also, in FIG. 2, one intelligent edge interrogator 100 connected to the one optical fiber sensor is illustrated. The intelligent edge interrogator 100 may be one of the plurality of intelligent edge interrogators 30 to 37 illustrated in FIG. 1.

The intelligent edge interrogator 100 may include a light generator 101, a light receiver 102, an optical signal measurer 103, a memory 104, a communication interface 105, a processor 106, and a storage medium 107.

The light generator 101 may generate an optical signal of a broad wavelength band on the basis of control by the processor 106 and may transmit the optical signal to an optical fiber sensor through the first optical fiber line L1, and the light receiver 102 may receive an optical signal reflected from the optical fiber sensor, based on control by the processor 106.

The optical signal measurer 103 may measure an optical wavelength of the reflected optical signal received by the light receiver 102 on the basis of control by the processor 106 and may generate and output sensing data corresponding to the measured optical wavelength.

The processor 106 may load a data preprocessor 104A and a short-term safety analysis AI model 104B, stored in the storage medium 107, into the memory 104 and may execute the data preprocessor 104A and the short-term safety analysis AI model 104B. In a case where the data preprocessor 104A and the short-term safety analysis AI model 104B are loaded into the memory 104, the data preprocessor 104A and the short-term safety analysis AI model 104B may each be a software module, but are not limited thereto and may each be a hardware module.

The data preprocessor 104A may extract short-term sensing data and/or long-term sensing data from sensing data output from the optical signal measurer 103, based on control by the processor 106.

As illustrated in FIG. 3, short-term sensing data STSD may be obtained by sampling sensing data at a sampling period T consisting of a predetermined short time unit (for example, second (sec)). Long-term sensing data LTSD may be obtained by calculating an average value and/or a feature value of each of pieces of short-term sensing data STSD1, STSD2, ..., and STSDn.

In terms of extracting the long-term sensing data LTSD from the short-term sensing data STSD, it may be considered that the data preprocessor 104A performs a data preprocessing process twice. That is, the data preprocessor 104A may sequentially perform, a first data preprocessing process of extracting the short-term sensing data STSD1, STSD2, ..., and STSDn from the sensing data and a second data preprocessing process of extracting long-term sensing data LTSD1, LTSD2, ..., and LTSDn from the short-term sensing data STSD1, STSD2, ..., and STSDn.

Furthermore, the second data preprocessing process of extracting the long-term sensing data may be selectively performed based on control by the processor 106. For example, in a case where the short-term safety analysis AI model 104B or the processor 106 analyzes the short-term sensing data to predict and diagnose safety of a corresponding facility and a risk situation is detected in the corresponding facility on the basis of a result of the prediction and diagnosis, the second data preprocessing process of extracting the long-term sensing data may be omitted. On the other hand, when a risk situation is not detected in a corresponding facility, the second data preprocessing process of extracting the long-term sensing data may be performed. This is because, when a risk situation is detected in a corresponding facility by analyzing short-term sensing data, the risk situation of the corresponding facility may be monitored based on the short-term sensing data representing the risk situation, and thus, it is not required to extract long-term sensing data from the short-term sensing data representing the risk situation.

As described above, the intelligent edge interrogator may selectively perform extraction and transmission of long-term sensing data, and thus, an operation load based on a preprocessing process and a network load occurring in a process of transmitting the long-term sensing data may be reduced.

The communication interface 105 may transmit short-term diagnosis data output from the short-term safety analysis AI model 104B and long-term sensing data, output from the data preprocessor 104A, to the server 50 over the communication network 40. In this case, when a risk situation of a corresponding facility is detected in the short-term diagnosis data, a preprocessing process of extracting the long-term sensing data and a process of transmitting the long-term sensing data to the server 50 may be omitted. When the risk situation of the corresponding facility is not detected, all of the short-term diagnosis data and the long-term sensing data may be transmitted to the server 50, or only the long-term sensing data may be transmitted to the server 50.

Figure 4:
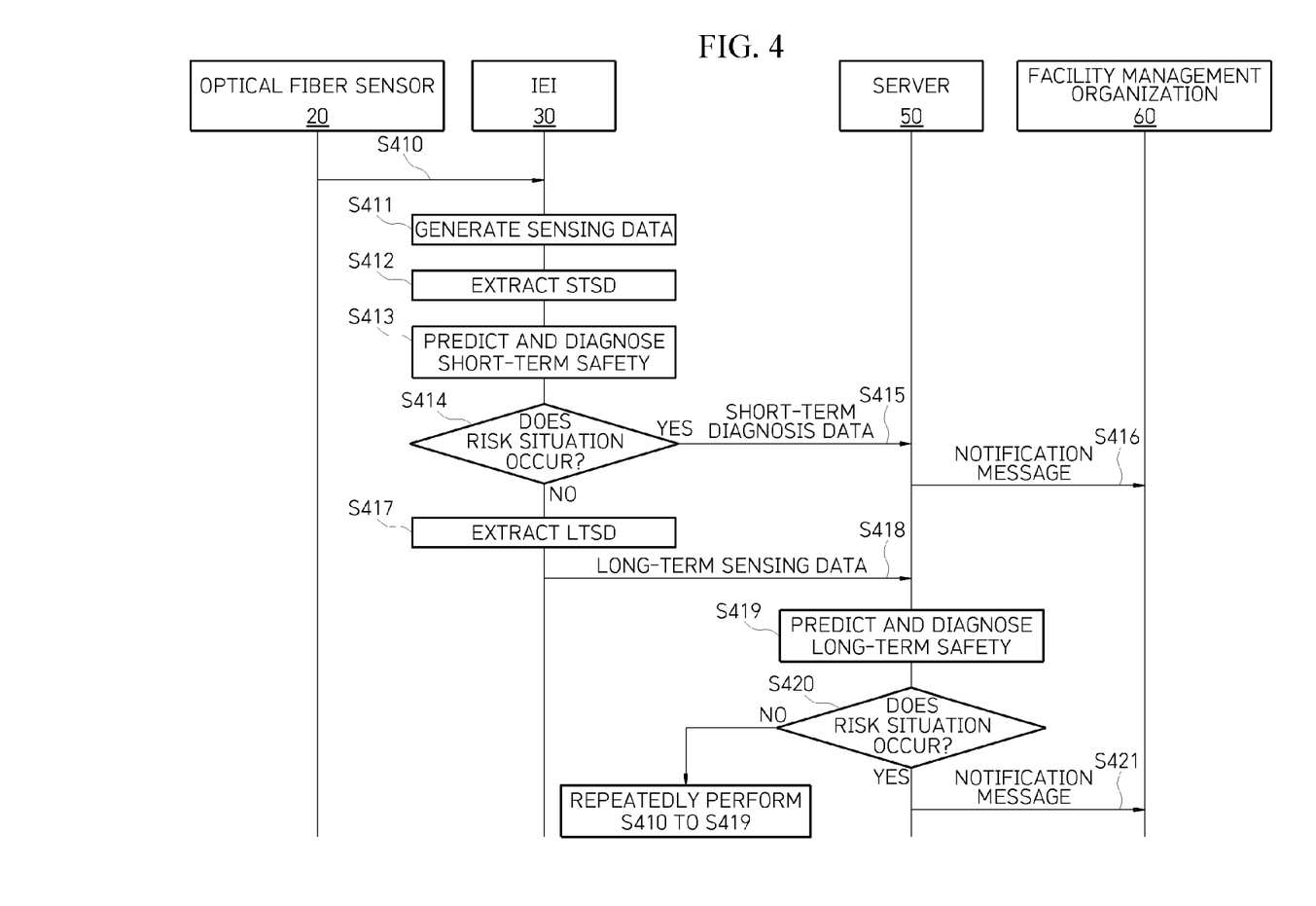
FIG. 4 is a flowchart for describing information exchanged between an optical fiber sensor, an intelligent edge interrogator, and a server according to an embodiment of the present invention.

FIG. 4 is a flowchart for describing information exchanged between an optical fiber sensor, an intelligent edge interrogator, and a server according to an embodiment of the present invention.

For conciseness of description, the flowchart of FIG. 4 illustrates information exchanged between one optical fiber sensor 20, one intelligent edge interrogator 30, a server 50, and a facility management organization 60. Therefore, pieces of information may be simultaneously exchanged between a plurality of optical fiber sensors, a plurality of intelligent edge interrogators, the server 50, and the facility management organization 60.

First, in step S410, a process of receiving an optical signal reflected from the optical fiber sensor 102 attached on the facility 10 by using the intelligent edge interrogator 30 or the light receiver 102 may be performed.

Subsequently, in step S411, a process of measuring an optical wavelength of the reflected optical signal to generate sensing data corresponding to the measured optical wavelength by using the intelligent edge interrogator 30 or an optical signal measurer (for example, 103 of FIG. 2) may be performed.

Subsequently, in step S412, a process of extracting the short-term sensing data STSD from the sensing data by using the intelligent edge interrogator 30 or a data preprocessor (1034A of FIG. 2) may be performed.

Subsequently, in step S413, a process of analyzing the short-term sensing data to predict and diagnose short-term safety of a facility (10 of FIG. 1) by using the intelligent edge interrogator 30 or a short-term safety analysis AI model (104B of FIG. 2) embedded in the intelligent edge interrogator 30 may be performed.

Subsequently, in step S414, a process of analyzing a scale value representing short-term safety of corresponding facilities (10 and 14 of FIG. 1) included in the short-term diagnosis data to determine risk situations of the facilities (10 and 14 of FIG. 1) by using the intelligent edge interrogator 30, the short-term safety analysis AI model (104B of FIG. 2), or a processor (106 of FIG. 2) may be performed.

Subsequently, in step S415, a process of transmitting the short-term diagnosis data to the server 50 over the communication network 40 by using a communication interface (for example, 105 of FIG. 2) on the basis of control by the processor (106 of FIG. 2) when the risk situations of the facilities (10 and 14 of FIG. 1) are detected from the short-term diagnosis data may be performed.

Subsequently, in step S416, a process of generating, by using the server 50, a notification message evacuating inhabitants near the facilities (10 and 14 of FIG. 1) or indicating the maintenance and repair of the facility (10 of FIG. 1) on the basis of the short-term diagnosis data representing the risk situations of the facilities (10 and 14 of FIG. 1) and transmitting the generated notification message to a facility management organization (or a server installed in the facility management organization) may be performed.

Furthermore, when the risk situations of the facilities (10 and 14 of FIG. 1) are not detected from the short-term diagnosis data in step S416 described above, a process of extracting the long-term sensing data LTSD from the short-term sensing data STSD by using the intelligent edge interrogator 30 or the data preprocessor (1034A of FIG. 2) may be performed in step S417.

Subsequently, in step S418, a process of transmitting the long-term sensing data LTSD to the server 50 over the communication network 40 by using the intelligent edge interrogator 30 or a communication interface (105 of FIG. 2) of the intelligent edge interrogator 30 on the basis of control by the processor 106 may be performed.

Subsequently, in step S419, a process of analyzing the long-term sensing data LTSD received from the intelligent edge interrogator 30 to predict and diagnose long-term safety of the facility (10 of FIG. 1) by using the server 50 or a long-term safety analysis AI model (53A of FIG. 1) embedded in the server 50 may be performed.

Subsequently, in step S420, a process of determining the occurrence or not of a risk situation in the facilities (10 and 14 of FIG. 1) by using the server 50, the long-term safety analysis AI model (53A of FIG. 1), or the processor 54 of the server 50 on the basis of the long-term diagnosis data (a scale value) obtained by predicting and diagnosing long-term safety of the facilities (10 and 14 of FIG. 1) may be performed.

Subsequently, in step S421, when the risk situations occur in the facilities (10 and 14 of FIG. 1), a process of generating, by using the server 50 or the processor 54 of the server 50, a notification message evacuating inhabitants near the facilities (10 and 14 of FIG. 1) or indicating the maintenance and repair of the facility (10 of FIG. 1) and transmitting the generated notification message to a facility management organization (or a server installed in the facility management organization) may be performed. When it is determined that the risk situations do not occur in the facilities (10 and 14 of FIG. 1), steps S410 to S419 described above may be performed.

Figure 5:
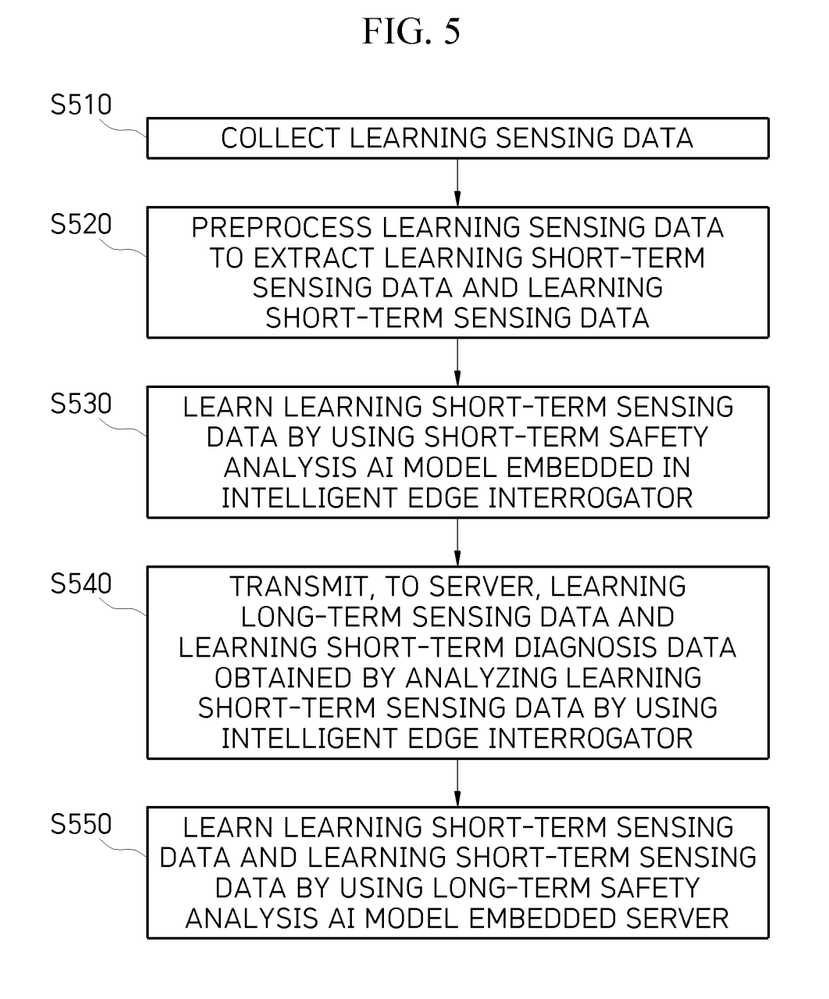
FIG. 5 is a flowchart for describing a learning method of a short-term safety analysis artificial intelligence (AI) model and a long-term safety analysis AI model included in an integrated facility safety control system according to an embodiment of the present invention.

FIG. 5 is a flowchart for describing a learning method of a short-term safety analysis AI model and a long-term safety analysis AI model included in an integrated facility safety control system according to an embodiment of the present invention.

Referring to FIG. 5, first, in step S510, a process of collecting learning sensing data classified based on types of facilities by using each of intelligent edge interrogators (30 to 37 of FIG. 1) may be performed.

Subsequently, in step S520, a process of preprocessing the collected learning sensing data to extract learning short-term sensing data and learning long-term sensing data by using a data preprocessor (104A of FIG. 2) embedded in each intelligent edge interrogator may be performed. Here, the learning short-term sensing data may be obtained by sampling the learning sensing data at a sampling period consisting of a short time unit (for example, second, minute, hour, day, week, etc.), and the learning long-term sensing data may be obtained through a measurement value processing process of calculating an average value and/or a feature value of the learning short-term sensing data.

Subsequently, in step S530, a process of learning the learning short-term sensing data so that a short-term safety analysis AI model embedded in each intelligent edge interrogator predicts short-term safety of a corresponding facility may be performed.

Subsequently, in step S540, by using each intelligent edge interrogator, a process of transmitting, to the server 50, learning short-term diagnosis data (or a learning variable of a learning-completed short-term safety analysis AI model) obtained by the learning-completed short-term safety analysis AI model by predicting the short-term safety on the basis of the learning short-term sensing data and the learning long-term sensing data obtained in step S520 may be performed. Here, the learning variable may be a weight value representing connection strength between layers or nodes configuring an artificial neural network of the short-term safety analysis AI model.

Subsequently, in step S550, a process of learning the learning long-term sensing data and the learning short-term diagnosis data (or a learning variable) received from a corresponding intelligent edge interrogator to predict long-term safety of a corresponding facility by using long-term safety analysis AI models of the server 50 classified based on types of facilities may be performed. In this case, the learning short-term diagnosis data may be used as data representing a risk history of each of distributed facilities (for example, a vibration history of a facility caused by a peripheral construction or earthquake). Only the learning long-term sensing data may be used in a process of learning long-term safety analysis AI models.

The short-term safety analysis AI model and the long-term safety analysis AI model may perform repetitive learning on the basis of actually collected short-term sensing data, short-term diagnosis data, and long-term sensing data, instead of performing learning once.

Therefore, the short-term safety analysis AI model and the long-term safety analysis AI model may be continuously updated based on the actually collected short-term sensing data, short-term diagnosis data, and long-term sensing data and may be intellectualized as a learning count increases, and thus, the accuracy of prediction of safety diagnosis of a corresponding facility may increase.

According to the embodiments of the present invention, a center server and an intelligent edge interrogator may divisionally perform an analysis operation on the short-term safety and long-term safety of facility on the basis of data collected from an optical fiber sensor, and thus, may solve a load of data concentrating on a center server, a problem of computing power, and a network problem caused by massive data transmission.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A control method of an integrated facility safety control system, the control method comprising:
   collecting short-term sensing data and long-term sensing data based on a physical change in a facility by using an intelligent edge interrogator;
   analyzing the short-term sensing data to obtain short-term diagnosis data representing short-term safety of the facility by using a short-term safety analysis artificial intelligence (AI) model embedded in the intelligent edge interrogator;
   transmitting at least one of the short-term diagnosis data and the long-term sensing data to a server by using the intelligent edge interrogator; and
   analyzing the long-term sensing data to obtain long-term diagnosis data representing long-term safety of the facility and transmitting a notification message, indicating a risk situation of the facility, to a facility management organization on a basis of the short-term diagnosis data or the long-term sensing data by using a long-term safety analysis AI model embedded in the server, wherein the collecting comprises:
receiving an optical signal, which is based on the physical change in the facility, from an optical fiber sensor attached on the facility;
measuring an optical wavelength of the optical signal to obtain sensing data;
performing a first data preprocessing process to extract the short-term sensing data from the sensing data; and
performing a second data preprocessing process to extract the long-term sensing data from the short-term sensing data,
wherein the extracting of the long-term sensing data comprises selectively performing the second data preprocessing process on a basis of the risk situation of the facility based on the short-term diagnosis data,
wherein, when the short-term diagnosis data indicates a risk situation to the facility, the second data preprocessing process is not performed.

2. The control method of claim 1, wherein the collecting comprises:
receiving an optical signal, which is based on the physical change in the facility, from an optical fiber sensor attached on the facility;
measuring an optical wavelength of the optical signal to obtain sensing data; and
preprocessing the sensing data to obtain the short-term sensing data and the long-term sensing data.

3. The control method of claim 2, wherein the obtaining of the short-term sensing data and the long-term sensing data comprises:
sampling the sensing data by predetermined time units to obtain the short-term sensing data; and
calculating an average value or a feature value of the short-term sensing data to obtain the long-term sensing data.

4. The control method of claim 1, wherein the transmitting of the at least one of the short-term diagnosis data and the long-term sensing data to the server comprises, when the short-term diagnosis data represents the risk situation of the facility, transmitting only the short-term diagnosis data to the server.

5. A learning method of an artificial intelligence (AI) model for predicting safety of a facility, the learning method comprising:
collecting learning sensing data corresponding to an optical signal based on a physical change in a facility by using an intelligent edge interrogator;
preprocessing, by a preprocessor, the learning sensing data to extract learning short-term sensing data and learning short-term sensing data by using the intelligent edge interrogator;
learning the learning short-term sensing data to predict short-term safety of the facility by using a short-term safety analysis AI model embedded in the intelligent edge interrogator;
transmitting, to a server, the learning long-term sensing data and learning short-term diagnosis data obtained by the short-term safety analysis AI model through prediction performed based on the learning short-term sensing data by using the intelligent edge interrogator; and
learning the learning short-term sensing data and learning short-term sensing data to predict long-term safety of the facility by using a long-term safety analysis AI model embedded in the server,
wherein, when the short-term diagnosis data represents a risk situation to the facility, the preprocessor stops a preprocessing process of extracting the long-term sensing data from the sensing data.

6. The learning method of claim 5, wherein the collecting comprises:
receiving the optical signal, which is based on the physical change in the facility, from an optical fiber sensor attached on the facility; and
measuring an optical wavelength of the optical signal to obtain the learning sensing data.

7. The learning method of claim 5, wherein the extracting comprises:
sampling the learning sensing data by predetermined time units to extract the learning short-term sensing data from the learning sensing data; and
calculating an average value or a feature value of the learning short-term sensing data to extract the learning long-term sensing data from the learning short-term sensing data.

8. The learning method of claim 5, wherein the learning of the learning short-term sensing data comprises learning the learning short-term sensing data, based on machine learning or deep learning.

9. The learning method of claim 5, wherein the learning of the learning long-term sensing data comprises learning the learning long-term sensing data, based on machine learning or deep learning.

10. An intelligent edge interrogator comprising:
a processor and a memory;
a light receiver configured to receive an optical signal from an optical fiber sensor attached on a facility, based on control by the processor;
an optical signal measurer configured to measure an optical wavelength of the optical signal to output sensing data representing a physical change in the facility, based on control by the processor;
a preprocessor loaded into the memory and configured to extract at least one of short-term sensing data and long-term sensing data from the sensing data, based on control by the processor;
a short-term safety analysis artificial intelligence (AI) model loaded into the memory and configured to analyze the short-term sensing data to output short-term diagnosis data representing short-term safety of the facility, based on control by the processor; and
a communication interface configured to transmit the short-term diagnosis data and the long-term sensing data to a server, based on control by the processor,
wherein, when the short-term diagnosis data represents a risk situation to the facility, the preprocessor stops a preprocessing process of extracting the long-term sensing data from the sensing data.

11. The intelligent edge interrogator of claim 10, wherein the long-term sensing data is used to predict and diagnose long-term safety of the facility in a long-term safety analysis AI model embedded in the server.

12. The intelligent edge interrogator of claim 10, wherein, when the short-term diagnosis data represents a risk situation of the facility, the communication interface transmits only the short-term diagnosis data to the server.

13. The intelligent edge interrogator of claim 10, wherein, when the short-term diagnosis data does not represent a risk situation of the facility, the communication interface transmits only the long-term sensing data to the server.

* * * * *